(12) United States Patent
Radzik

(10) Patent No.: US 7,625,017 B1
(45) Date of Patent: Dec. 1, 2009

(54) COUPLING WITH ALIGNMENT BOLT HOLES AND METHOD OF ALIGNING A COUPLING

(75) Inventor: Joseph G. Radzik, West Warwick, RI (US)

(73) Assignee: Tyco Fire Products LP, Lansdale, PA (US)

( * ) Notice: Subject to any disclaimer, the term of this patent is extended or adjusted under 35 U.S.C. 154(b) by 17 days.

(21) Appl. No.: 11/775,973

(22) Filed: Jul. 11, 2007

Related U.S. Application Data (60) Provisional application No. 60/939,966, filed on May 24, 2007.

(51) Int. Cl.
*F16L 23/00* (2006.01)

(52) U.S. Cl. .................. 285/415; 285/411; 285/368; 29/237

(58) Field of Classification Search ............ 285/411, 285/367, 415, 412, 368; 29/890.14, 890.141, 29/237
See application file for complete search history.

(56) References Cited

U.S. PATENT DOCUMENTS

| | | | | |
|---|---|---|---|---|
| 863,887 A * | 8/1907 | Stuttle | | 285/373 |
| 4,611,839 A * | 9/1986 | Rung et al. | | 285/367 |
| 4,639,020 A * | 1/1987 | Rung et al. | | 285/367 |
| 4,896,902 A * | 1/1990 | Weston | | 285/93 |
| 5,018,548 A * | 5/1991 | McLennan | | 137/315.23 |
| 5,246,257 A * | 9/1993 | Kojima et al. | | 285/112 |
| 5,758,907 A * | 6/1998 | Dole et al. | | 285/112 |
| 6,139,069 A * | 10/2000 | Radzik | | 285/112 |
| 6,626,466 B1 * | 9/2003 | Dole | | 285/112 |
| 7,090,259 B2 * | 8/2006 | Dole | | 285/367 |

OTHER PUBLICATIONS

Figure 7012 Gruvlok Flange, Gruvlok Data Sheet 5, Anvil International, Inc., Portsmouth, NH (5 pages).
Vic-Flange Adapters, Styles 741 and 743, Victaulic Company, Easton, PA (8 pages).
Field Installation Handbook for IPS and Metric Carbon Steel Stainless Steel and Aluminum Products, Flange Adapters for Grooved-End Pipe, pp. 113-118, Victaulic, Easton, Pa.
Figure 7401 Rigidlok Coupling, Gruvlok Data Sheet 15, Anvil International, Inc., Portsmouth, NH (4 pages).
Style HP-70, Style 89, Style 489, Standard Couplings for Grooved-End Pipe Installation Instructions (2 pages__.

* cited by examiner

*Primary Examiner*—David E Bochna
(74) *Attorney, Agent, or Firm*—Perkins Coie LLP (57) ABSTRACT

A coupling having two or more mating components with alignment of the mating components provided by mating projections and recesses. The components include extensions having bolt hole that align to form a bolt pathway when the components are properly aligned, and that do not align to form a bolt pathway through the extensions when the components are improperly aligned.

7 Claims, 8 Drawing Sheets

COUPLING WITH ALIGNMENT BOLT HOLES AND METHOD OF ALIGNING A COUPLING

This application claims benefit of priority to U.S. Provisional Patent Application No. 60/939,966 filed May 24, 2007 which is incorporated by reference in its entirety.

FIELD OF THE INVENTION

The subject invention relates to piping systems and, more particularly, to couplings and gaskets joining components of piping systems.

BACKGROUND OF THE INVENTION

A coupling assembly is a multi-piece assembly that, when assembled, joins a pipe to another pipe. Some assemblies use structures that facilitate the proper assembly of the coupling by providing an obstruction to an anticipated type of improper assembly of the coupling. The obstruction can be provided with a shape to the components of the coupling that facilitates a specific alignment of the components, and that interferes with assembly when not aligned. However, even with these structures, it is believed that improper assembly can be still be achieved and, in some cases, overlooked by the assembler. In such cases, the improperly aligned coupling can be assembled and secured with bolts and other connectors without the assembler having knowledge of the non-alignment, which would likely lead to failure of the coupling assembly. Accordingly, there is a need for a coupling assembly that indicates when the components of the coupling are not aligned, and that prevents or impedes the assembly of the coupling when disposed in an improper orientation.

SUMMARY OF THE INVENTION

The preferred coupling has at least two identical or similar components that mate with each other to form the coupling, which are secured to each other with circumferentially-arranged bolt assemblies. The coupling engages one or more pipes using structures and methods appropriate for the type of connection. The components of the coupling engage each other with one or more mating pairs of projections and recesses defining a proper alignment of the components of the coupling. The components of the coupling also have extensions defining bolt holes for the circumferentially-arranged bolt assemblies. The extensions include a thickness that provides a length to each bolt holes, and also defines common pathways through which the bolts of the circumferentially-arranged bolt assemblies pass during assembly. The lengths of the mating bolt holes form the common pathway only when the components are properly aligned, and improper alignment prevents formation of the common pathway through the mating components. The non-formation of the common pathway limits the depth of insertion of the bolts of the circumferentially-arranged bolt assemblies into the bolt holes, thereby preventing or noticeable impeding assembly of the coupling when improperly aligned.

The preferred coupling also includes an arcuate first component having an end with a projection and an end with a recess and an arcuate second component having an end with a projection and an end with a recess. The ends of the first and second components are formed to engage each other in a proper alignment in which the projections are disposed proximate to corresponding recesses and formed to engage each other in an improper alignment in which the projections are disposed proximate to each other and the recesses are disposed proximate to each other. Each end has an extension with a wall defining a circumferential bolt hole through the extension, and the wall of each end is disposed to form a common bolt pathway between ends when in the proper alignment and disposed to not form the common bolt pathway between ends when in the improper alignment. The preferred coupling can include at least one circumferential bolt assembly having a bolt, with the bolt extending through the common bolt pathway when in the proper alignment. The preferred coupling can also include at least one circumferential bolt assembly having a bolt, with the bolt not extending through the common bolt pathway when in the improper alignment. The preferred coupling can further have the wall of one end of a pair of engaging ends impede the insertion of a bolt through the circumferential bolt hole of the one end.

The preferred method of assembling a coupling includes mating ends of an arcuate first component with corresponding ends of an arcuate second component in an initial alignment in which projections are disposed proximate to each other and in which recesses are disposed proximate to each other, and indicating that the initial alignment is an improper alignment of the first and second coupling by disposing circumferential bolt holes of corresponding ends such that a bolt does not pass completely through the corresponding ends. The method can also include subsequently realigning the mating ends of the first component with corresponding ends of the second component in a secondary alignment in which projections are disposed proximate to recesses.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 5B is a partial cross-sectional plan view, and FIG. 5E is a cross-sectional view of FIG. 5B.

DETAILED DESCRIPTION

Figure 1:
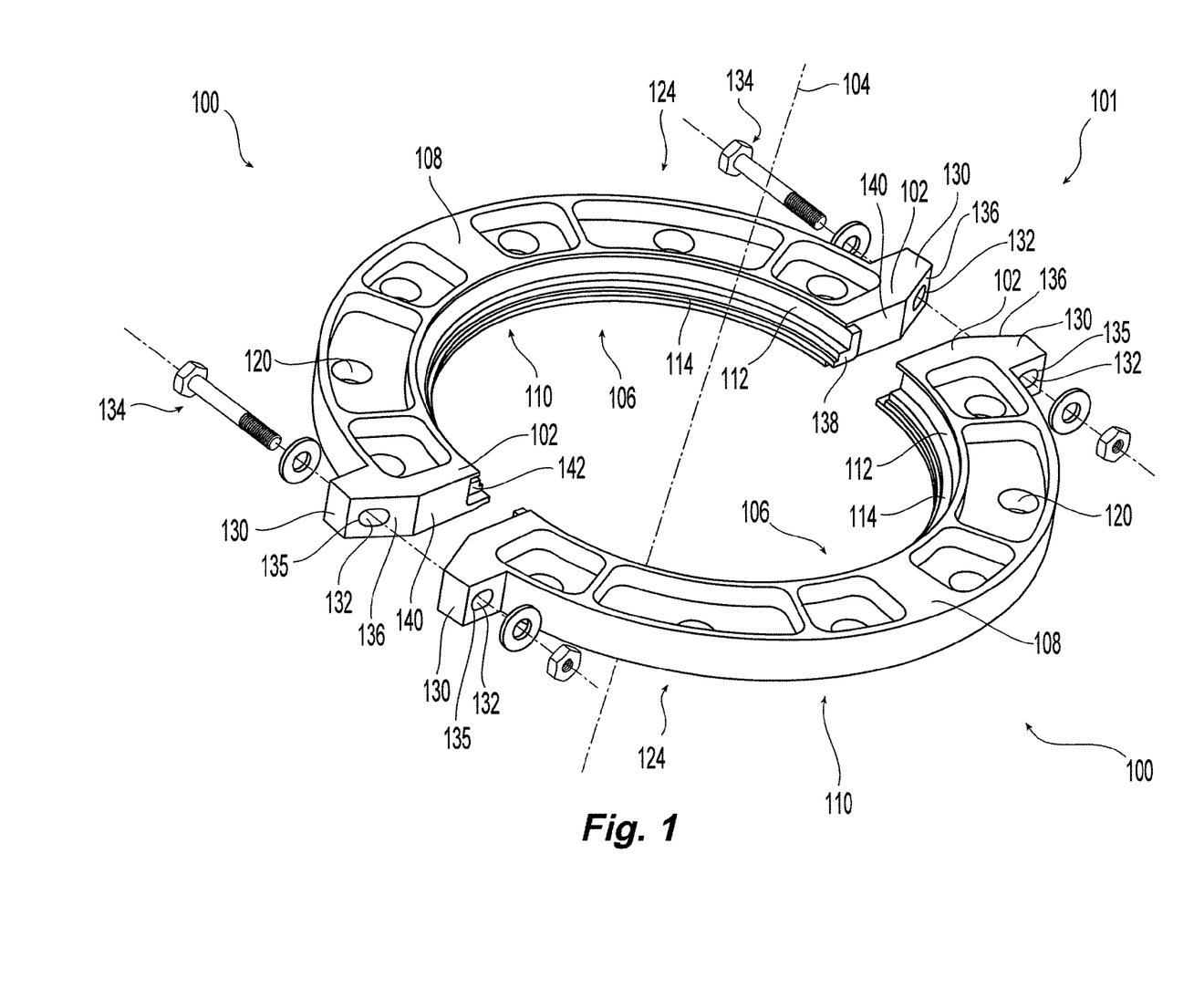
FIG. 1 is an isometric view of two portions of a coupling assembly with circumferential bolt assemblies.
Figure 2:
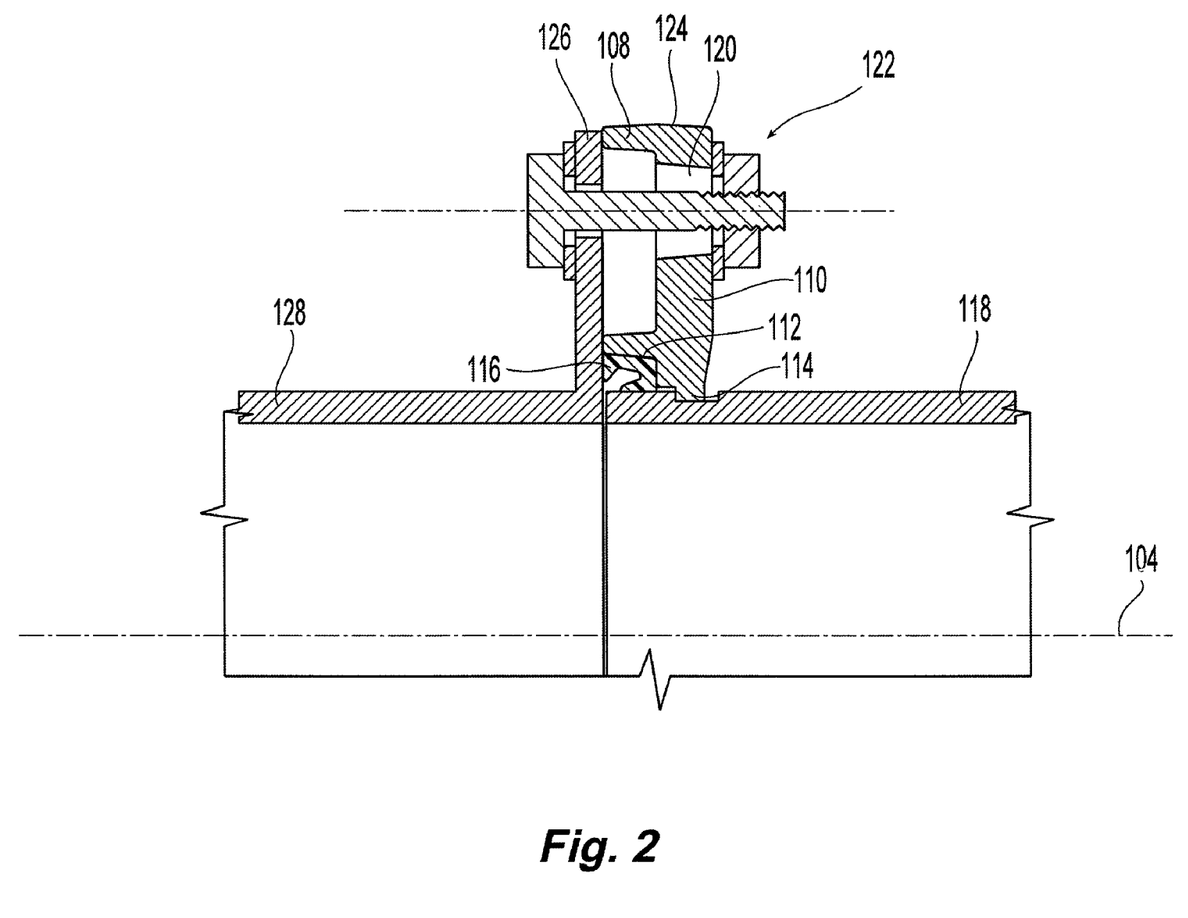
FIG. 2 is a partial cross-sectional view of a portion of the coupling assembly of FIG. 1 illustrated with partial cross sections of a grooved pipe, a flanged pipe, a gasket, and a longitudinal bolt assembly.

FIG. 1 illustrates a coupling assembly 101 having two components 100 that, when assembled, abut each other at ends 102 to form the coupling assembly 101 relative to a longitudinal axis 104. As illustrated, each component 100 has an arcuate shape with an inner surface 106 and a first face 108 and an opposing second face 110. In the coupling assembly illustrated in FIGS. 1 and 2, the inner surface includes a groove 112 extending radially outward and into the component 100, and a lip 114 extending radially inward towards the axis 104. As illustrated in FIG. 2, the groove 112 provides a space accommodating a gasket 116, and the lip 114 extends to engage the exterior surface of a grooved pipe 118. As also illustrated in FIGS. 1 and 2, the first face 108 and second face 110 include a plurality of bolt holes 120 positioned to accept a longitudinal bolt assembly 122 that holds the flange 124 of the coupling assembly securely to a flange 126 of flanged pipe 128. Thus, as illustrated, the coupling assembly 101 facilitates the connection of the grooved pipe 118 to the flanged pipe 128.

Alternatively, the coupling assembling 101 could be formed to connect a first grooved pipe to a second grooved pipe, by replacing the flange 126 with an additional lip located on the inner surface 106 to engage the second groove pipe. Another alternative is to form the coupling assembly 101 to engage only one or to join two or more pipes together with any available connection mechanism or method by replacing the flange 126 and the groove 112 and lip 114 structures to accommodate the alternative connection method. For example, the coupling assembly 101 could instead function as an end cap for a pipe by having a connection structure that engages the end of a pipe and by having the opposite end of the end cap assembly blocked or restricted to form an end cap or a similar flow-limiting structure. Yet another alternative is to have no connection structures (e.g., grooves, lips, flanges) at all and, instead, provide a surface suitable for welding the assembly to a pipe end. Still another alternative is to combine these various connection structures as needed for the connection of two or more pipes, or to seal or modify the end of a single pipe.

As illustrated in FIG. 1, each end 102 includes an extension 130 extending radially away from the component 100. Alternatively, the extension 130 can extend in another direction from the component. Each extension 130 provides a circumferential bolt hole 132 that aligns with a corresponding circumferential bolt hole 132 provided in a mating component 100 to allow the passage of circumferential bolt assemblies 134 therethrough. As can be appreciated, when two mating components 100 of the coupling assembly 101 are assembled, the circumferential bolt assemblies 134 secure one component 100 to a mating component 100. As illustrated, each extension 130 has an inclined surface 136 that, in the radially outward direction from axis 104, is disposed to provide a gap between mating extensions 130 through which the circumferential bolt assembly 134 passes. It can thus be appreciated that, when assembled, the circumferential bolt holes 132 define a pathway through which the circumferential bolt assemblies 134 pass to secure one component 100 to another component 100. It can also be appreciated that along the pathway for each circumferential bolt assembly 134, only a portion of the pathway is surrounded by the walls 135 defining the circumferential bolt holes 132 in the extensions 130, and that there is a central portion of the circumferential bolt assembly 134 that is not surrounded by the walls 135 of the circumferential bolt holes 132. Thus, in the coupling assembly 101 illustrated in FIG. 1 for example, the mating components 100 do not directly engage each other in the area proximate to the circumferential bolt holes 132, and the engagement of the mating components 100 is disposed radially inward from the position of the circumferential bolt holes 132 primarily at mating surface 140.

Referring to FIG. 1, at each end 102 is either a projection 138 extending from the mating surface 140 of the end 102, or a recess 142 formed to accept the projection 138 when the mating components 100 are assembled with each other. As illustrated in FIG. 1, the projection 138 of each component 100 engages or enters a corresponding recess 142 of a mating component 100 to align the components with each other at assembly. As can be appreciated, the projection and recess can have a variety of forms that provide a portion extending from one component 100 so as to engage a corresponding recess of a mating component 100 and facilitate the alignment of the components with each other. Preferably, the projection 138 and recess 142 are formed on or proximate to the inner surface 106 so as to in part abut a gasket 116 disposed within or adjacent to the inner surface 106, as illustrated in FIGS. 1 and 2 taken together.

By the arrangement of components 100 illustrated in FIG. 1, the projection 138 and recess 142 are advantageously disposed at or adjacent to the inner surface 106, which is believed to facilitate the casting of the components 100 because the projection 138 and recess 142 are easy to access and clean during casting, as compared to other designs that place the projection and recess in the middle of the mating surfaces 140. The recess 142, and the placement of the recess 142 at the inner surface 106, is believed to provide fewer surfaces and corners in the mold design, as compared to designs that place a cavity centrally located on the mating surfaces 140. Another advantage derives from the engagement between the corresponding projections 138 and recesses 142. In other designs, it is believed that when two mating surfaces are brought together and abut each other, a gasket disposed near the abutting mating surfaces can become pinched between the surfaces as they come together, which could result in an improper fit or damage to the gasket. In the coupling assembly 101 illustrated in FIG. 1, however, the pinching of the gasket 116 is believed to be eliminated because the gasket 116 is not disposed near two tightly-mating surfaces. As illustrated in FIG. 1, the projection 138 has a length that is slightly less than the depth of the recess 142, i.e., the depth of the recess 142 from the mating surface 140 of one component 100 is greater than the height of the projection 138 from the mating surface 140 of a mating component 100. Because of this difference in the height of the projection 138 and the depth of the recess 142, the endmost portion of the projection 138 does not bottom out, or abut, the base of the recess 142, and leaves a gap that is large enough to allow the escape of the gasket 116 if pinched by the joining of mating components 100. The projection 138 and recess 142 thus form a shield that is disposed between the gasket 116 and the two adjoining mating surfaces 140 at each end 102 to protect and separate the gasket 116 from the engagement of corresponding mating surface 140 when mating components 100 are assembled.

Although the above-described coupling assembly 101 involves the engagement of two component 100, the assembly can involve the engagement of more than two components 100 to form the assembly. Also, one mating pair of ends 102 can engage each other as described above but another mating pair of ends 102 could be coupled together as a hinge or as an interlocking structure, thereby requiring the use of only a single circumferential bolt assembly 134.

In the subsequent drawings and description, similar structures and features are not again identified or described unless necessary.

Figure 3A:
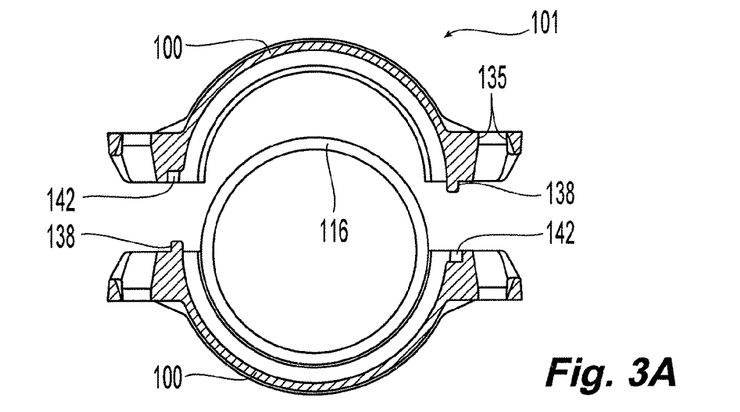
FIGS. 3A-3C are partial cross-sectional views of two portions of a coupling assembly, gasket, and circumferential bolt assemblies.
Figure 3B:
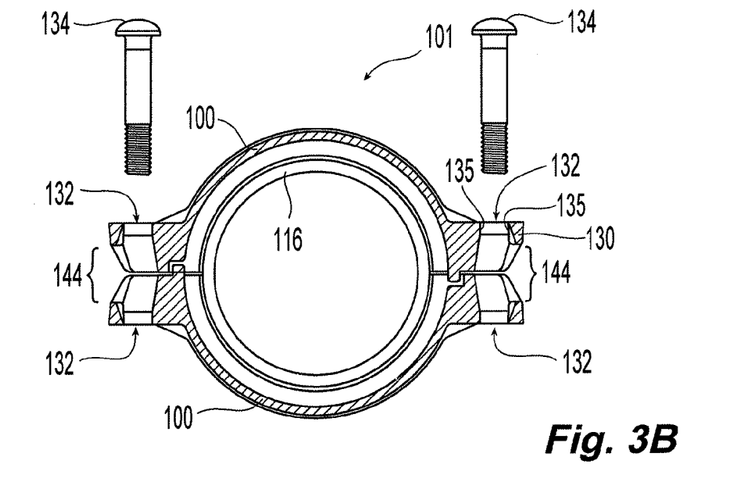
Figure 3C:
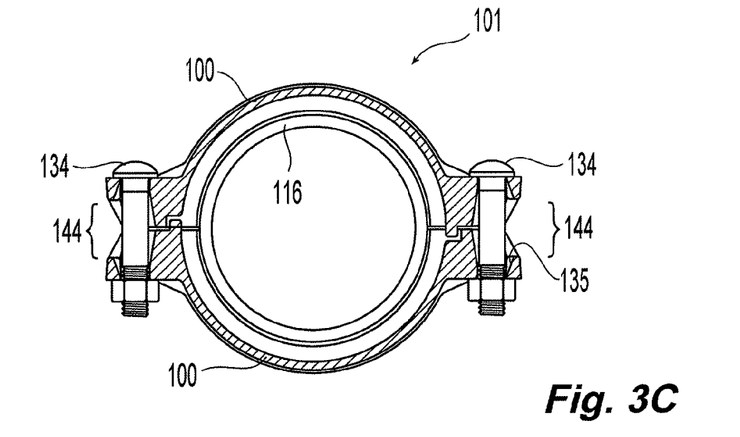

As illustrated in the cross-sectional view in FIG. 3A of an embodiment that has at least one lip and groove structure and no flange, when two mating components 100 are brought together to assemble the coupling assembly 101, it is preferred that the projection 138 on each component 100 be disposed to mate with the corresponding recess 142 on the mating component 100. As illustrated in FIGS. 3B and 3C, when the two components 100 are adjacent to each other in proper alignment, the circumferential bolt holes 132 of each component 100 align with each other to define a pathway through the circumferential bolt holes 132 facilitating the insertion of the bolts of the circumferential bolt assemblies 134. As illustrated in FIGS. 3B and 3C, a gap 144 is formed by the assembly of the mating components 100 between the mating extensions 130 defining the circumferential bolt holes 132. The shape of the extensions 130 form the gaps 144 and expose a portion of the circumferential bolt assemblies 134 in the assembled coupling assembly 101.

Figure 4A:
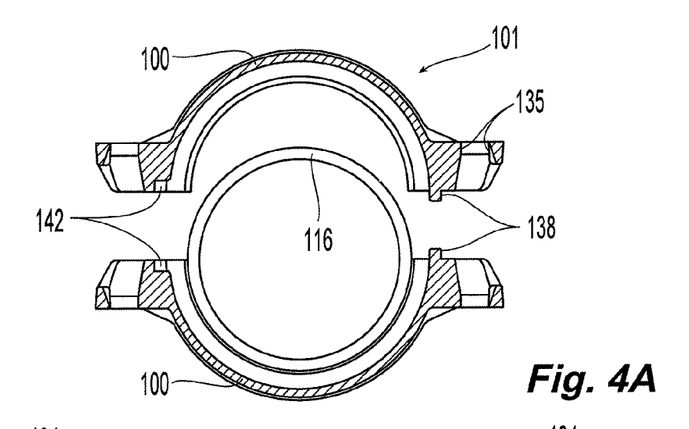
FIGS. 4A-4C are partial cross-sectional views of two portions of a coupling assembly, gasket, and circumferential bolt assemblies.
Figure 4B:
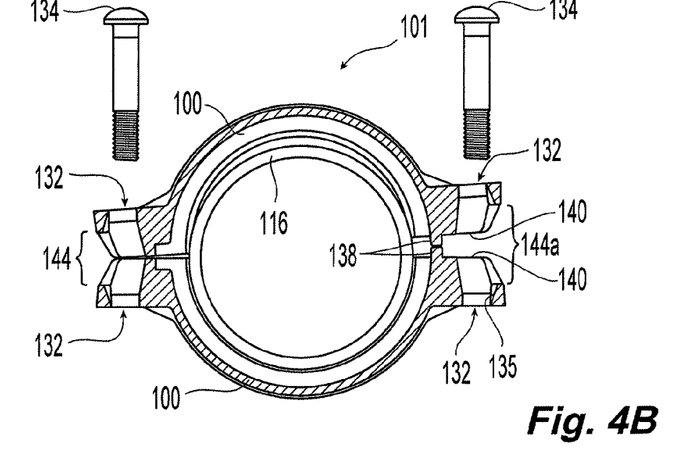
Figure 4C:
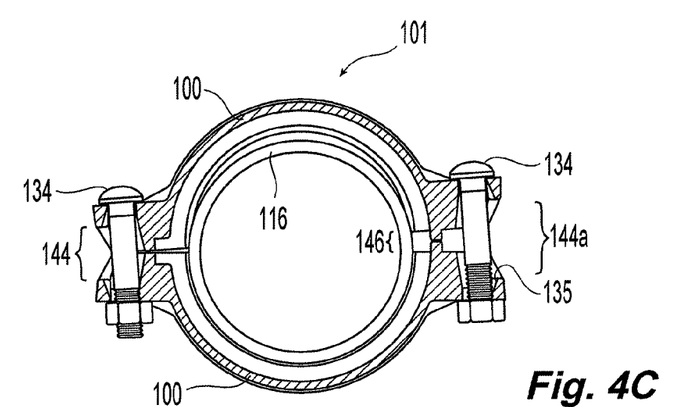
Figure 5A:
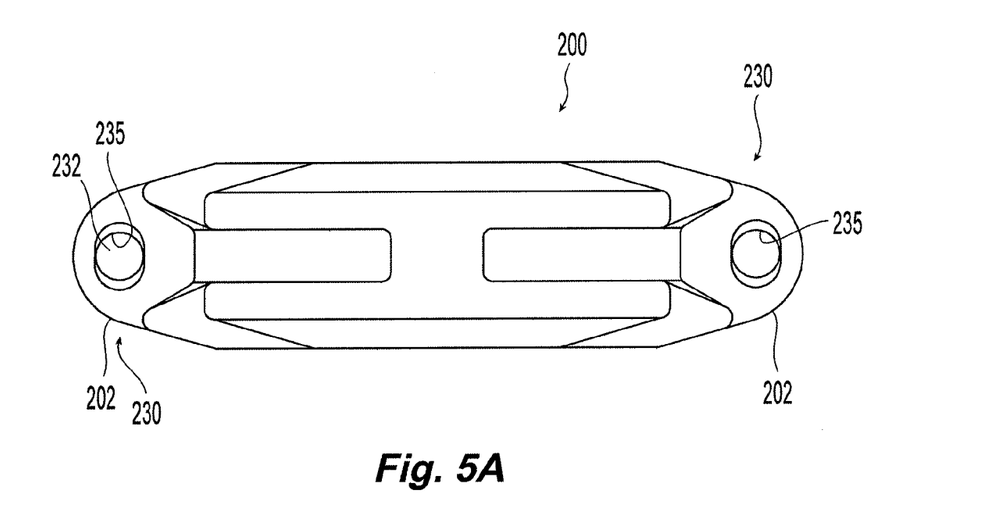
FIGS. 5A-5E are top, plan, bottom, side, and cross-sectional views of a portion of an exemplary coupling.
Figure 5B:
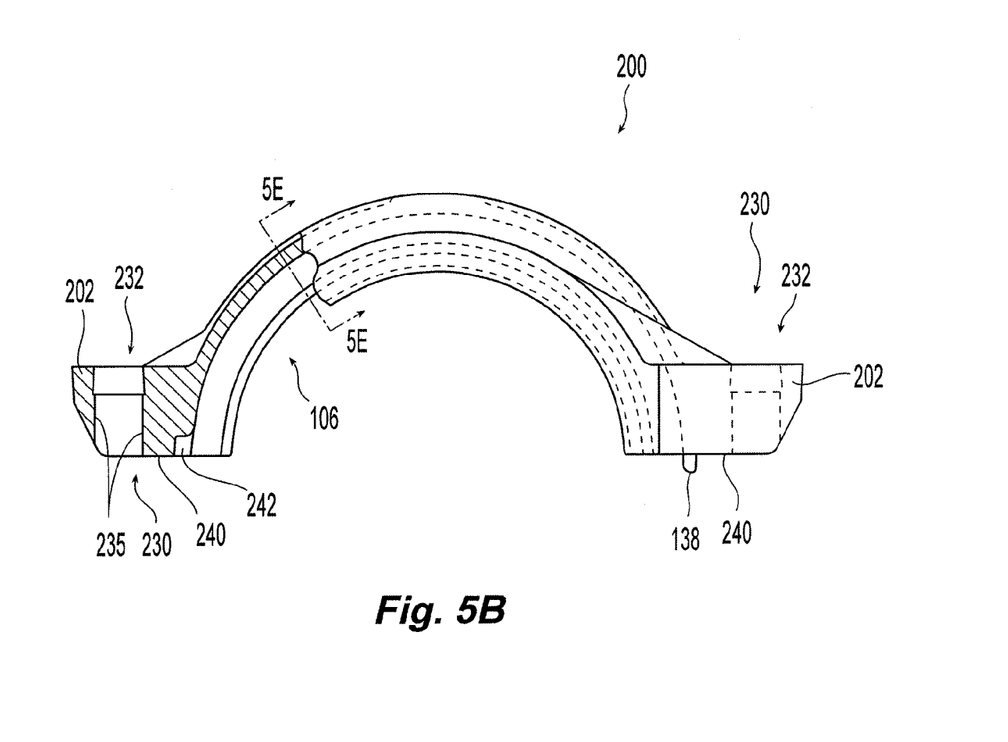
Figure 5C:
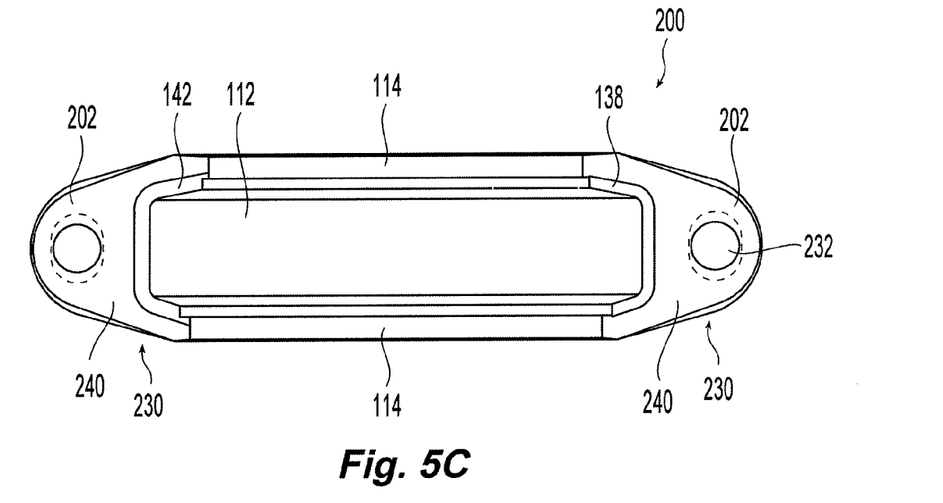
Figure 5D:
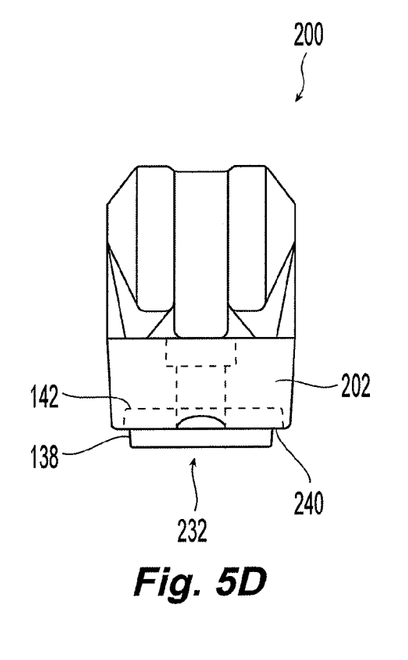
Figure 5E:
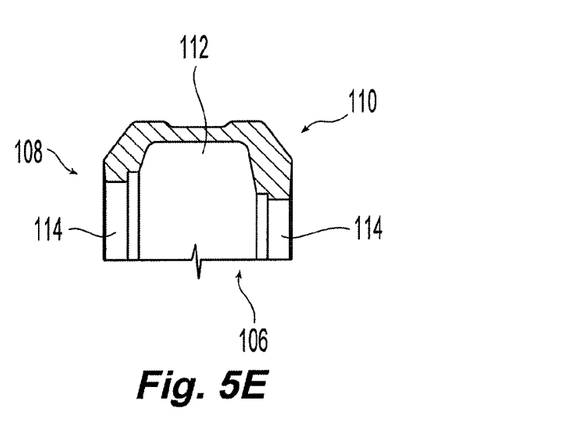

In FIGS. 4A-4C the same embodiment of FIGS. 3A-3C is illustrated. However, the coupling assembly 101 is improperly assembled because the mating components 100 are oriented so that the recesses 142 on each are mated with each other and so that the projections 138 on each are mated with each other. As illustrated in FIG. 4B, the improper engagement of the mating components 100 prevents at least one pair of mating surfaces 140 from fully engaging each other because of the interference between the mating projections 138. This arrangement of components 100 defines two gaps, a gap 144 that is similar to the gap 144 illustrated in FIGS. 3B-3C, and a gap 144a that is larger than the gap 144. As illustrated in FIG. 4C, the gap 144a facilitates the formation of an area 146 where gasket 116 is not supported by inner surface 106 of each mating component 100. It is believed that the lack of support of gasket 116 at area 146 will make the gasket 116, and the assembly 101 as a whole, prone to leaks. It is also believed that the formation of gap 144a will prevent the proper engagement of the coupling assembly 101 with coupled pipes, such as pipes 118 and 128, and possibly lead to the disengagement of the coupling assembly 101 from the connected pipes or another failure mode of the assembly.

It can be appreciated from FIGS. 4A-4C that, when mating components 100 are adjacent to each other in an improper alignment, the circumferential bolt holes 132 of each component 100 will permit the formation of a pathway through the mating circumferential bolt holes 132 that allows the insertion of the bolts of the circumferential bolt assemblies 134. As illustrated in FIG. 4C, an improper assembly can result because the circumferential bolt assemblies 134 can be fully installed. It is believed that designs that permit an improper alignment of components 100, and the formation of a pathway and the full insertion and assembly of the circumferential bolt assemblies 134, are more likely to allow installation of the assembly 101 to proceed with the assembler not being aware of the improper alignment between mating components 100. If the assembler does not notice the improper alignment, it is believed that the coupling assembly will leak, disengage, or otherwise fail, resulting in additional cost and time to repair the misaligned assembly or to address the consequences of such a failure.

In the embodiment illustrated in FIGS. 5A-5E, a component 200 is provided with ends 202 that have extensions 230 with walls 235 defining the circumferential bolt holes 232 that, at least in part, extend for the entire thickness of the ends 202 in a direction perpendicular to mating surface 240. Each of the circumferential bolt holes 232 are thus defined by a wall 235 that has a length that is, at least in part, approximately as long as the thickness of the end 202 through which the bolt of the circumferential bolt assembly 134 passes through. Furthermore, the component 200 provides a mating surface 240 that has a length, in the radial direction from axis 104, that extends from the inner surface 106 radially outward to the portion of the wall 235 adjoining the mating surface 240. Preferably, the mating surface 240 adjoins the wall 235 so as to circumscribe at least half of the edge of circumferential bolt hole 232 facing the gap 144b, as illustrated in FIGS. 6A-6C.

Figure 6A:
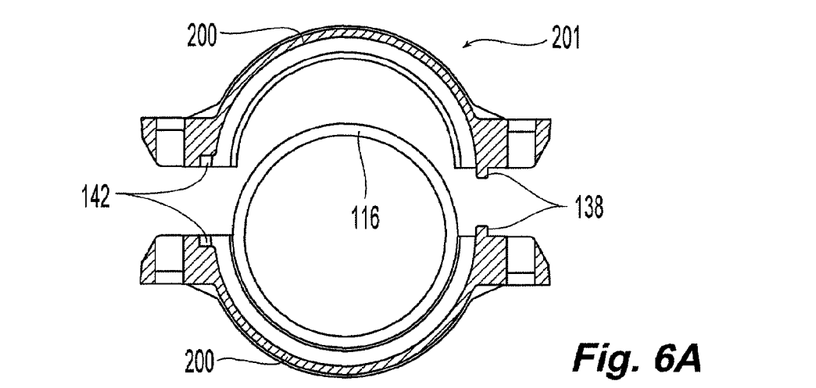
FIGS. 6A-6C are partial cross-sectional views of two portions of another exemplary coupling assembly with a gasket and circumferential bolt assemblies.
Figure 6B:
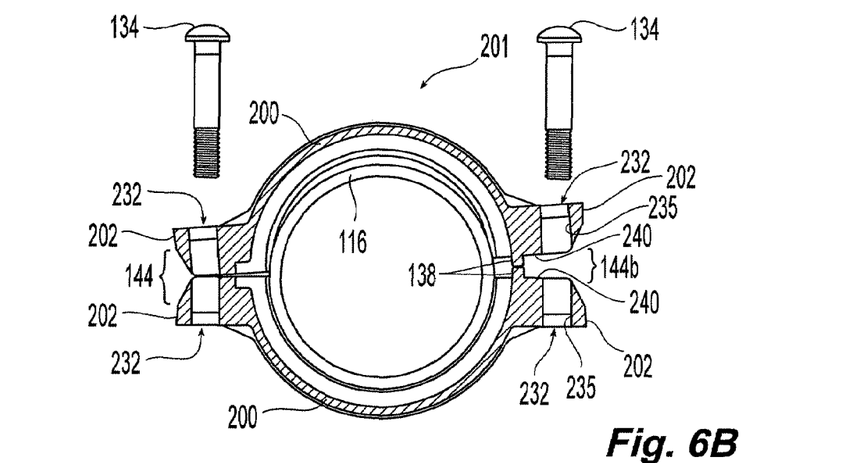
Figure 6C:
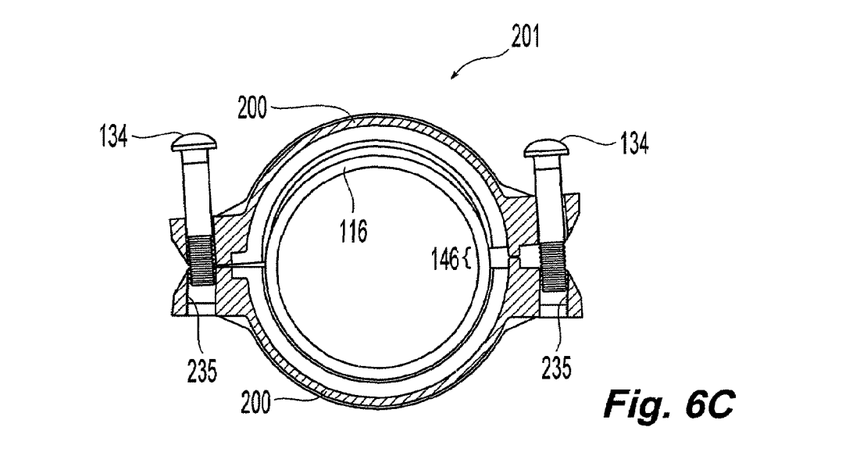

A preferred embodiment of the coupling assembly 201 is illustrated in FIGS. 6A-6C. As illustrated previously in FIGS. 4A-4C, the coupling assembly 201 of FIGS. 6A-6C is improperly assembled because the mating components 200 are oriented so that the recesses 142 on each are mated with each other and so that the projections 138 on each are mated with each other. As illustrated in FIG. 6B, the improper engagement of the mating components 200 prevents at least one pair of mating surfaces 240 from fully engaging each other because of the interference between the mating projections 138. This arrangement of components 200 defines two gaps, a gap 144 that is similar to the gap 144 illustrated in FIGS. 3B-3C, and a gap 144b that is larger than the gap 144 but smaller than the gap 144a of FIGS. 4B-4C. As illustrated in FIG. 6C, the gap 144b facilitates the formation of an area 146 where gasket 116 is not supported by inner surface 106 of each mating component 200.

As illustrated in FIGS. 6B and 6C, the walls 235 defining the circumferential hole holes 232 of the ends 202 extend, at least in part, for the entire thickness of the ends 202. As can be appreciated, the increased lengths of the circumferential bolt holes 232, when mated with corresponding circumferential bolt holes 232, prevents the formation of a pathway that the bolt of the circumferential bolt assembly 134 can follow when inserted through corresponding circumferential bolt holes 232. As illustrated in FIG. 6C, when components 200 are improperly assembled, the insertion of the bolt of the circumferential bolt assembly 134 can not fully pass through two corresponding circumferential bolt holes 232 because the walls 235 of one of the circumferential bolt holes 232 impede the progress of the bolt, thereby preventing the full assembly of the circumferential bolt assembly 134. It is believed that the impeding of the insertion of the bolt will advantageously indicate to the assembler that the alignment of the components of assembly is improper, and thereby allow immediate reassessment of the assembly and corrective measures. It is also believed that the impeding will advantageously prevent the assembly of components that are misaligned, thereby minimizing the potential of failure of the coupling assembly and gasket.

As can also be appreciated from the described embodiments, and in particular FIGS. 6A-6C, the formation of non-formation of a pathway through mating circumferential bolt holes depends in part on the height of the projections from the mating surface, and the distance between the improper aligned projections and the location of the pathway. The height of the projections and the distance between the projection and the pathway defines the angle that is formed by the components when misaligned. As can be appreciated, a greater angle provides for a more noticeable misalignment of mating circumferential bolt holes and mating components, and further limits or impedes the insertion of the bolts of the circumferential bolt assemblies 134. As shown in FIGS. 6B and 6C, the non-formation of the pathway can simultaneously take place at two ends 202 of the coupling assembly 201. However, it is believed that a sufficient indication can be provided to the assembler if only one pathway is not formed due to the misalignment.

Figure 7:
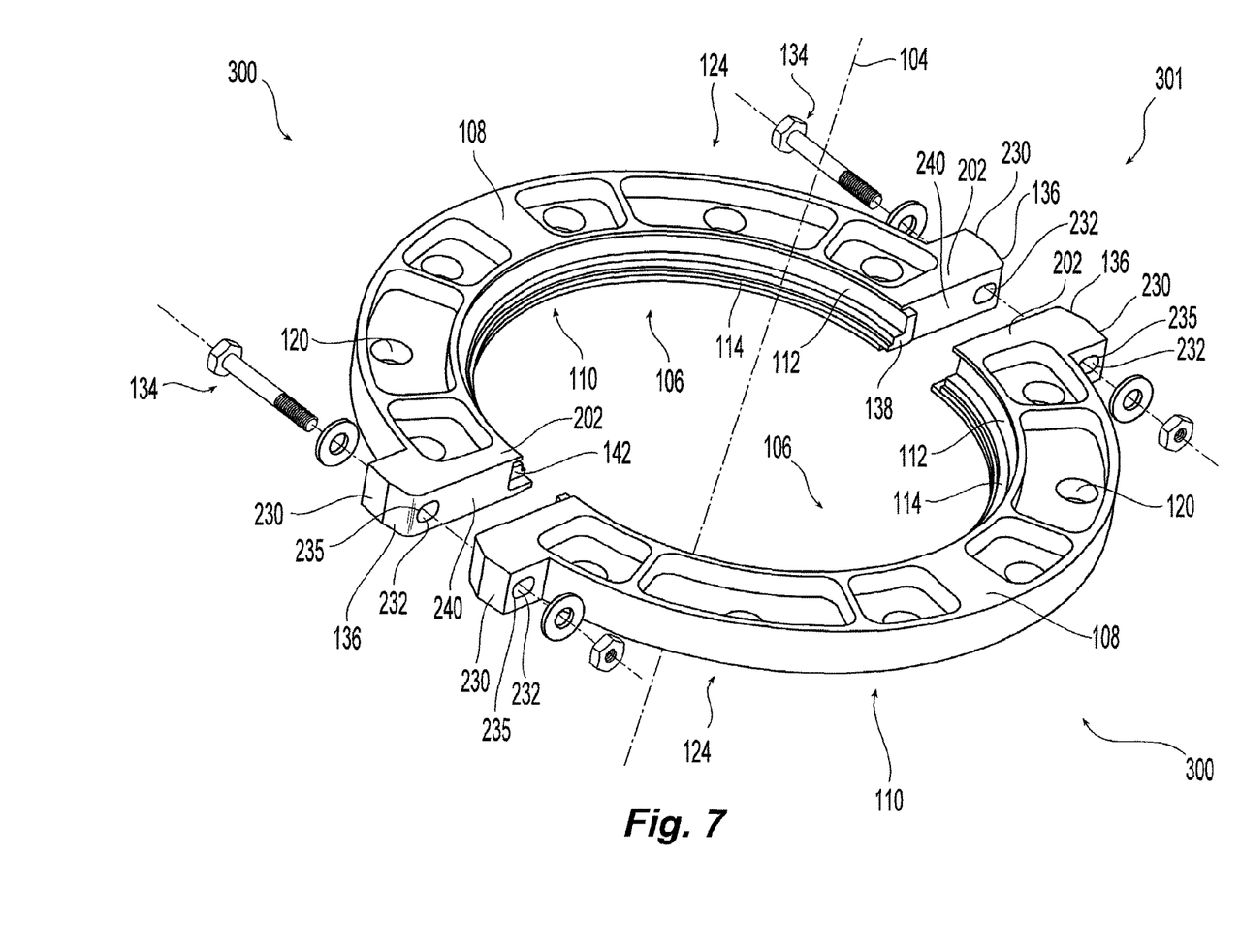
FIG. 7 is an isometric view of two portions of an exemplary coupling assembly with circumferential bolt assemblies.

FIG. 7 illustrates another embodiment combining features described previously in regard to FIGS. 1, 2, 5A-5F, and 6A-6C. As illustrated, FIG. 7 is of a coupling assembly 301 having components 300 that have the flange 126, the groove 112, and the lip 114 structures described with regard to FIGS. 1 and 2, and the thicker ends 202 described in regard to FIGS.

5A-6C. Other structures and features illustrated in FIG. 7 are described above in regard to FIGS. 1, 2, 5A-5F, and 6A-6C and are thus not again identified or described.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

It is claimed:

1. A coupling assembly, comprising:
   an arcuate first component defining a radial direction and having a first end with a first mating surface and an adjacent projection and a second end with a second mating surface and an adjacent recess, the first and second mating surfaces disposed radially outward from the projection and recess; and
   an arcuate second component having a first end with a first mating surface and an adjacent recess and a second end with a second mating surface and an adjacent projection, the first and second mating surfaces disposed radially outward from the projection and recess,
   the first and second components having a proper alignment in which the first mating surface and the projection of the first component is disposed proximate to the first mating surface and the recess of the second component, and the second mating surface and the recess of the first component is disposed proximate to the second mating surface and the projection of the second component,
   the first and second components having an improper alignment in which the projection of the first component is disposed to abut the projection of the second component, and the recess of the first component is disposed proximate to the recess of the second component,
   each end of the first and second components having an extension disposed radially outward from the first or second mating surfaces, a bolt hole wall disposed within the extension and defining a bolt hole through the extension, the bolt holes of proximate ends disposed to form a common bolt pathway when the first and second components are in the proper alignment and disposed to not permit the formation of the common bolt pathway when the first and second components are in the improper alignment; and
   at least one bolt assembly having a bolt, the bolt extending fully through the bolt hole of the first component and extending partially into the corresponding bolt hole of the second component, the bolt abutting the bolt hole wall of the second component and not extending fully through the first and second components when the first and second components are in the improper alignment.

2. The coupling assembly of claim 1, wherein the
   at least one bolt assembly having the bolt, the bolt extends through the common bolt pathway when the first and second components are in the proper alignment.

3. A coupling assembly, comprising:
   an arcuate first component defining a radial direction and having a first end with a first mating surface and an adjacent projection and a second end with a second mating surface and an adjacent recess, the first and second mating surfaces disposed radially outward from the projection and recess; and
   an arcuate second component having a first end with a first mating surface and an adjacent recess and a second end with a second mating surface and an adjacent projection, the first and second mating surfaces disposed radially outward from the projection and recess,
   the first and second components having a proper alignment in which the first mating surface and the projection of the first component is disposed proximate to the first mating surface and the recess of the second component, and the second mating surface and the recess of the first component is disposed proximate to the second mating surface and the projection of the second component,
   the first and second components having an improper alignment in which the projection of the first component is disposed to abut the projection of the second component, and the recess of the first component is disposed proximate to the recess of the second component,
   each end of the first and second components having an extension disposed radially outward from the first or second mating surfaces, a bolt hole wall disposed within the extension and defining a bolt hole through the extension, the bolt holes of proximate ends disposed to form a common bolt pathway when the first and second components are in the proper alignment and disposed to not permit the formation of the common bolt pathway when the first and second components are in the improper alignment, the bolt hole wall of one end of a pair of proximate ends disposed to impede the insertion of a bolt through the first or second components when the first and second components are in the improper alignment, the bolt hole wall disposed between opposing openings of the bolt hole.

4. The coupling assembly of one of claims 1 and 3, the first component projection extending from the first mating surface.

5. The coupling assembly of one of claims 1 and 3, the first component projection defining an inner surface of the first component formed to abut a gasket.

6. A method of assembling a coupling, comprising:
   mating ends of an arcuate first component with corresponding ends of an arcuate second component in an initial alignment in which projections of the first and second components are disposed to abut each other and in which recesses of the first and second components are disposed proximate to each other, the arcuate first component defining a radial direction, each mating end including mating surfaces disposed radially outward from an adjacent projection or recess; and
   indicating that the initial alignment is an improper alignment of the first and second components by inserting a bolt into corresponding bolt holes of the corresponding ends such that the bolt does not pass completely through the first and second components and is impeded by abutting an internal wall disposed between openings defining one of the corresponding bolt holes to prevent the assembly of the coupling at one of the corresponding ends, each bolt hole being disposed radially outward from an adjacent mating surface of each mating end.

7. The method of claim 6, further comprising:
   after indicating the improper alignment, realigning the first and second components in a secondary alignment in which the projection of the first component is disposed proximate the recess of the second component and in which the recess of the first component is disposed proximate the projection of the second component so as to permit the insertion of the bolt through the first and second components.

* * * * *